US012226875B2

(12) United States Patent
Sanders et al.

(10) Patent No.: US 12,226,875 B2
(45) Date of Patent: *Feb. 18, 2025

(54) SYSTEM AND METHOD FOR FLUID CAVITATION PROCESSING A PART

(71) Applicant: The Boeing Company, Chicago, IL (US)

(72) Inventors: Daniel G. Sanders, Cle Elum, WA (US); Amanda J. Wickramaratne, Portland, OR (US); Hali T. Diep, Renton, WA (US); Gregory L Ramsey, Seabeck, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,993

(22) Filed: Oct. 4, 2022

(65) Prior Publication Data

US 2023/0029286 A1 Jan. 26, 2023

Related U.S. Application Data

(62) Division of application No. 16/275,100, filed on Feb. 13, 2019, now Pat. No. 11,465,259.

(51) Int. Cl.
*B24C 3/04* (2006.01)
*B08B 3/12* (2006.01)
(Continued)

(52) U.S. Cl.
CPC ............ *B24C 1/10* (2013.01); *B08B 3/12* (2013.01); *B08B 9/0321* (2013.01); *B24C 3/04* (2013.01);
(Continued)

(58) Field of Classification Search
CPC .. B24C 1/10; B24C 3/04; B24C 3/325; B24C 5/04; B24C 7/0038; B24C 9/00;
(Continued)

(56) References Cited

U.S. PATENT DOCUMENTS 3,081,580 A * 3/1963 Powell ..................... B24C 9/00
451/326
6,341,151 B1 1/2002 Enomoto et al.
(Continued)

FOREIGN PATENT DOCUMENTS

CN 1237499 A 12/1999
CN 101247859 A 8/2008
(Continued)

OTHER PUBLICATIONS

Extended European Search Report for EP Patent Application No. 19212501.1 dated Mar. 11, 2020.
(Continued)

*Primary Examiner* — Ryan J. Walters
(74) *Attorney, Agent, or Firm* — Kunzler Bean & Adamson

(57) ABSTRACT

Disclosed herein is a system for surface treating an internal surface of a part. The system comprises a tank within which the part is locatable. The system also comprises a fluid within the tank and capable of submersing the part when the part is located within the tank. The system further comprises a nozzle submersed in the fluid and configured to generate a stream of cavitated fluid directed in a first direction. The system additionally comprises a deflection tool submersed in the fluid and comprising a deflection surface that redirects the stream of cavitated fluid from the first direction to a second direction. The first direction is away from the internal surface of the part and the second direction is toward the internal surface of the part.

20 Claims, 9 Drawing Sheets

(51) Int. Cl.
  *B08B 9/032*   (2006.01)
  *B24C 1/10*    (2006.01)
  *B24C 3/32*    (2006.01)
  *B24C 5/04*    (2006.01)
  *B24C 7/00*    (2006.01)
  *B24C 9/00*    (2006.01)
  *B33Y 40/20*   (2020.01)
  *C21D 7/06*    (2006.01)
  *B29C 71/00*   (2006.01)

(52) U.S. Cl.
  CPC ............... *B24C 3/325* (2013.01); *B24C 5/04* (2013.01); *B24C 7/0038* (2013.01); *B24C 9/00* (2013.01); *B33Y 40/20* (2020.01); *C21D 7/06* (2013.01); *B29C 2071/0045* (2013.01)

(58) Field of Classification Search
  CPC ............ B29C 2071/0045; B29C 64/35; B08B 9/0321; B08B 3/12; B33Y 40/20; C21D 7/06
  See application file for complete search history.

(56) References Cited

U.S. PATENT DOCUMENTS

| | | | |
|---|---|---|---|
| 6,855,208 B1 | 2/2005 | Soyama | |
| 9,200,341 B1 | 12/2015 | Sanders et al. | |
| 10,376,942 B2 * | 8/2019 | Maeguchi | C21D 9/50 |
| 2009/0027576 A1 | 1/2009 | Fukami et al. | |
| 2010/0255759 A1 | 10/2010 | Ohashi et al. | |
| 2016/0361746 A1 * | 12/2016 | Maeguchi | G21C 17/003 |
| 2019/0061103 A1 | 2/2019 | Sanders | |
| 2019/0061104 A1 | 2/2019 | Sanders et al. | |
| 2020/0189068 A1 | 6/2020 | Sanders | |

FOREIGN PATENT DOCUMENTS

| | | |
|---|---|---|
| CN | 101559409 A | 10/2009 |
| CN | 202640118 U | 1/2013 |
| CN | 108608338 | 10/2018 |
| DE | 102006037069 | 2/2007 |
| JP | H04362124 | 12/1992 |
| JP | 2000121786 | 4/2000 |
| JP | 2007050492 | 3/2007 |
| JP | 2007155544 | 6/2007 |
| JP | 2008221375 | 9/2008 |
| JP | 2015186830 | 10/2015 |
| WO | 2009031517 | 12/2010 |

OTHER PUBLICATIONS

Extended European Search Report for EP Patent Application No. 19217738.4 dated Jun. 18, 2020.
Office Action for EP Patent Application No. 19217738.4 dated Apr. 21, 2022.
European Communication for EP Patent Application No. 19217738.4 dated Aug. 25, 2022.
Japan Office Action for JP Patent Application No. 2019-232374 issued Oct. 31, 2023.
Chinese Office Action for CN Patent Application No. 202010089034.8 issued May 15, 2024.

* cited by examiner

SYSTEM AND METHOD FOR FLUID CAVITATION PROCESSING A PART

FIELD

This disclosure relates generally to fluid cavitation processing of manufactured parts, and more particularly to surface treating manufactured parts, with difficult-to-access surfaces, using fluid cavitation processes.

BACKGROUND

Fluid cavitation processing is used to treat the surfaces of manufactured parts. According to some techniques, fluid cavitation processes are used to peen the surface of a manufactured part to produce a compressive residual stress layer and modify the mechanical properties of the part. In other techniques, abrasive media is introduced into the fluid cavitation process to help finish and reduce the surface roughness of a manufactured part. For some complex parts or complex features in parts, such as those made using additive manufacturing techniques, accessing difficult-to-reach surfaces of the parts with cavitated fluid can be difficult.

SUMMARY

The subject matter of the present application has been developed in response to the present state of the art, and in particular, in response to the shortcomings of fluid cavitation processing techniques for treating difficult-to-reach surfaces of manufactured parts, that have not yet been fully solved by currently available techniques. Accordingly, the subject matter of the present application has been developed to provide a fluid cavitation system and method for treating difficult-to-reach surfaces of manufactured parts that overcome at least some of the above-discussed shortcomings of prior art techniques.

Disclosed herein is a system for surface treating an internal surface of a part. The system comprises a tank within which the part is locatable. The system also comprises a fluid within the tank and capable of submersing the part when the part is located within the tank. The system further comprises a nozzle submersed in the fluid and configured to generate a stream of cavitated fluid directed in a first direction. The system additionally comprises a deflection tool submersed in the fluid and comprising a deflection surface that redirects the stream of cavitated fluid from the first direction to a second direction. The first direction is away from the internal surface of the part and the second direction is toward the internal surface of the part. The preceding subject matter of this paragraph characterizes example 1 of the present disclosure.

The nozzle does not have line-of-sight with the internal surface of the part, when the part is located within the tank. The deflection surface has line-of-sight with the internal surface of the part, when the part is located within the tank. The preceding subject matter of this paragraph characterizes example 2 of the present disclosure, wherein example 2 also includes the subject matter according to example 1, above.

The deflection tool is fixed to the tank at a location adjacent the part when the part is located within the tank. The preceding subject matter of this paragraph characterizes example 3 of the present disclosure, wherein example 3 also includes the subject matter according to any one of examples 1-2, above.

The deflection tool is fixed to the part within a recessed portion of the part. The recessed portion of the part defines the internal surface. The preceding subject matter of this paragraph characterizes example 4 of the present disclosure, wherein example 4 also includes the subject matter according to any one of examples 1-2, above.

The deflection surface is flat. The preceding subject matter of this paragraph characterizes example 5 of the present disclosure, wherein example 5 also includes the subject matter according to any one of examples 1-4, above.

The deflection surface is curved. The preceding subject matter of this paragraph characterizes example 6 of the present disclosure, wherein example 6 also includes the subject matter according to any one of examples 1-5, above.

The deflection surface is concave. The preceding subject matter of this paragraph characterizes example 7 of the present disclosure, wherein example 7 also includes the subject matter according to example 6, above.

The deflection surface is convex. The preceding subject matter of this paragraph characterizes example 8 of the present disclosure, wherein example 8 also includes the subject matter according to example 6, above.

The deflection tool comprises a sphere and the deflection surface is a surface of the sphere. The preceding subject matter of this paragraph characterizes example 9 of the present disclosure, wherein example 9 also includes the subject matter according to example 8, above.

The deflection tool further comprises at least two deflection surfaces. The preceding subject matter of this paragraph characterizes example 10 of the present disclosure, wherein example 10 also includes the subject matter according to any one of examples 1-9, above.

The deflection surface has a contour that complements a contour of the internal surface of the part. The preceding subject matter of this paragraph characterizes example 11 of the present disclosure, wherein example 11 also includes the subject matter according to any one of examples 1-10, above.

The second direction is perpendicular relative to the internal surface. The preceding subject matter of this paragraph characterizes example 12 of the present disclosure, wherein example 12 also includes the subject matter according to any one of examples 1-11, above.

The part comprises a rectangular-shaped pocket. The internal surface comprises four sides each perpendicular to an adjacent side. The deflection tool is located within the rectangular-shaped pocket when the part is located within the tank. The deflection tool comprises four deflection surfaces each configured to direct a portion of the stream of cavitated fluid towards a corresponding one of the four sides of the internal surface. The preceding subject matter of this paragraph characterizes example 13 of the present disclosure, wherein example 13 also includes the subject matter according to any one of examples 1, 2, and 4-12, above.

Malleability of the deflection surface of the deflection tool is greater than malleability of the part. The preceding subject matter of this paragraph characterizes example 14 of the present disclosure, wherein example 14 also includes the subject matter according to any one of examples 1-13, above.

The stream of cavitated fluid is configured to, upon contacting the internal surface of the part, impart compressive stress to the part at the internal surface. The preceding subject matter of this paragraph characterizes example 15 of the present disclosure, wherein example 15 also includes the subject matter according to any one of examples 1-14, above.

The system further comprises abrasive media intermixed with the fluid within the tank. The stream of cavitated fluid further comprises the abrasive media. The abrasive media of the stream of cavitated fluid is configured to, upon contacting the internal surface of the part, reduce a roughness of the internal surface of the part. The preceding subject matter of this paragraph characterizes example 16 of the present disclosure, wherein example 16 also includes the subject matter according to any one of examples 1-14, above.

Further disclosed herein is a method of surface treating an internal surface of a part. The method comprises directing a stream of cavitated fluid in a first direction away from the internal surface of the part and into contact with a deflection surface of a deflection tool. The method also comprises deflecting the stream of cavitated fluid off of the deflection surface in a second direction toward the internal surface of the part. The method additionally comprises impacting the internal surface of the part with the stream of cavitated fluid deflected off of the deflection surface. The preceding subject matter of this paragraph characterizes example 17 of the present disclosure.

Impacting the internal surface of the part with the stream of cavitated fluid comprises imparting a compressive stress to the part at the internal surface. The preceding subject matter of this paragraph characterizes example 18 of the present disclosure, wherein example 18 also includes the subject matter according to example 17, above.

The method further comprises introducing abrasive media into the stream of cavitated fluid. Impact the internal surface of the part with the stream of cavitated fluid comprises impacting the internal surface of the part with the abrasive media introduced into the stream of cavitated fluid and reducing a surface roughness of the internal surface of the part with the abrasive media. The preceding subject matter of this paragraph characterizes example 19 of the present disclosure, wherein example 19 also includes the subject matter according to example 17, above.

At least a portion of the deflection tool is located within a recessed portion of the part. The stream of cavitated fluid is directed at least partially into the recessed portion of the part in the first direction. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
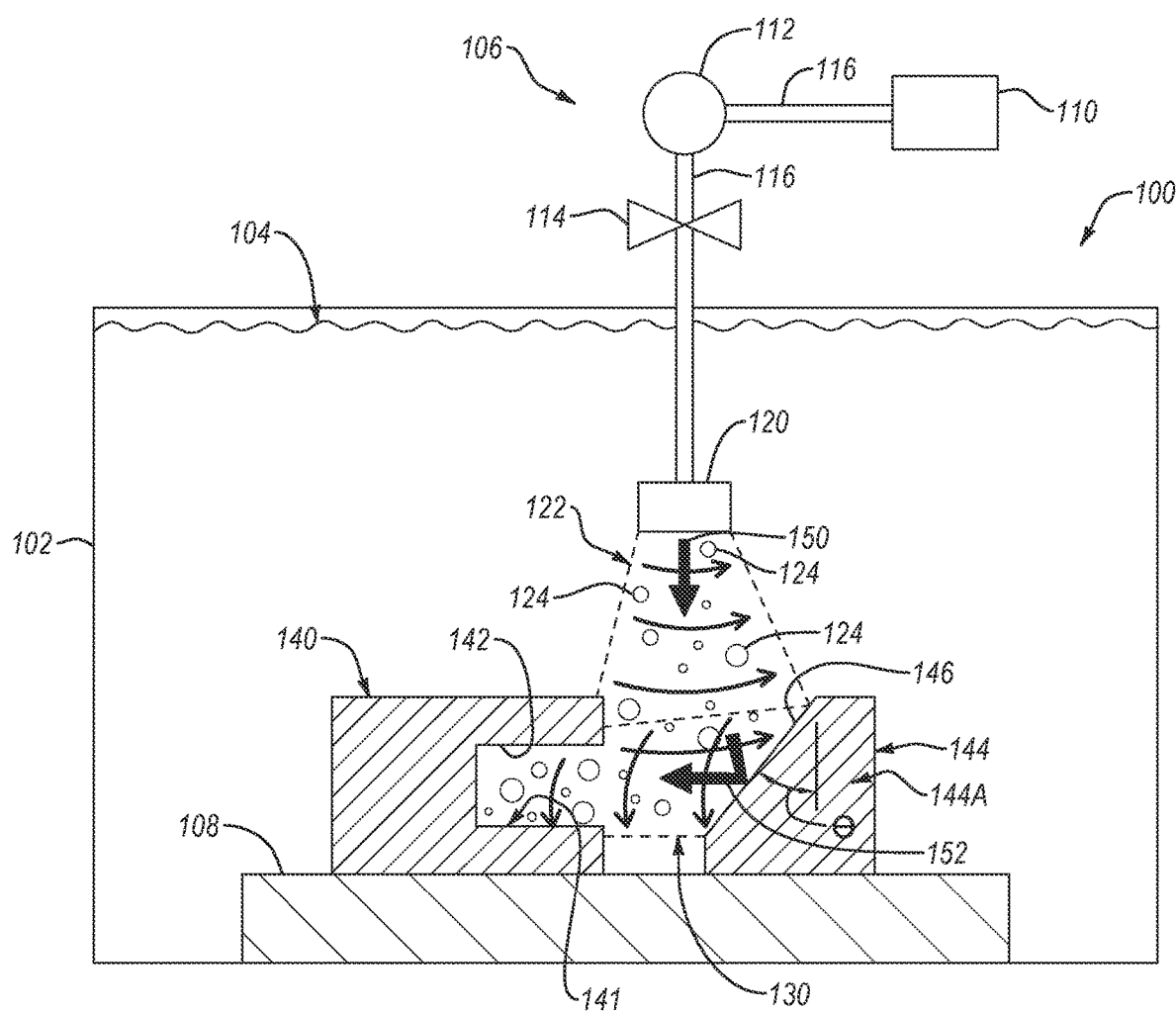
FIG. 1 is a schematic side view of a system for surface treating an internal surface of a part, according to one or more examples of the present disclosure.

Referring to FIG. 1, according to some examples, described herein is a system 100 for surface treating an internal surface 142 of a part 140. The system 100 includes a tank 102 within which the part 140 is locatable. The system 100 also includes a fluid 104 within the tank 102. The fluid 104 is capable of submersing the part 140 when the part 140 is located within the tank 102. The system 100 also includes a nozzle 120 submersed in the fluid 104. The nozzle 120 is configured to generate a stream of cavitated fluid 122 directed in a first direction 150. The system 100 additionally includes a deflection tool 144 submersed in the fluid 104. The deflection tool 144 includes a deflection surface 146 that redirects the stream of cavitated fluid 122 from the first direction 150 to a second direction 152. The first direction 150 is away from the internal surface 142 of the part 140 and the second direction 152 is toward the internal surface 142 of the part 140.

The system 100 helps to intensify the fluid cavitation process (e.g., cavitation peening or cavitation abrasive surface finishing) on surfaces of the part 140 that are not within line-of-sight of the nozzle 120. For example, in certain implementations, the nozzle 120 does not have line-of-sight with the internal surface 142 of the part 140 to be surface finished, when the part 140 is located within the tank 102. However, in such implementations, the deflection surface 146 has line-of-sight with the internal surface 142 of the part 140 to be surface finished, when the part 140 is located within the tank 102, which promotes directionality of the stream of cavitated fluid 122 to reach surfaces of the part 140 with an intensity that is not achievable without the deflection tool 144.

The tank 102 is configured to contain the fluid 104. Generally, the tank 102 includes a bottom and sides extending upwardly from the bottom. The sides are coupled to each other to laterally enclose the tank 102. A top of the tank 102 is at least partially open, which allows the fluid 104 to be poured into the tank 102 and provides access for the nozzle 120 to be located within the fluid 104 in the tank 102. The tank 102 is filled with enough fluid 104 to entirely submerse the part 140, the deflection tool 144, and the nozzle 120 in the fluid 104. The fluid 104 is water in some examples and a fluid, other than water, in other examples.

The nozzle 120 forms part of a stream generation subsystem 106 of the system 100. The stream generation subsystem 106 allows the nozzle 120 to generate the stream of cavitated fluid 122. In certain examples, the stream generation subsystem 106 includes, in addition to the nozzle 120, a fluid source 110, a pump 112, a valve 114, and a series of conduits 116. The conduits 116 fluidly couple together the fluid source 110, the pump, the valve 114, and the nozzle 120. The pump 112 draws fluid 104 from the fluid source 110 and presents the fluid 104 to the valve 114. The valve 114 is a pressure regulation valve that is configured to regulate the pressure of the fluid 104 before presenting the fluid 104 to the nozzle 120. In some implementations, the valve 114 is an electronically-controlled valve that pressurizes the fluid 104 to a desired and adjustable pressure. The valve 114 facilitates control of the flow rate of the fluid 104 supplied to the nozzle 120. The pressure and flow rate of the fluid 104 supplied to the nozzle 120 proportionally affects the energy of the stream of cavitated fluid 122. Accordingly, the energy of the stream of cavitated fluid 122, and thus the level of surface treatment, is adjustable via control of the valve 114.

Figure 2:
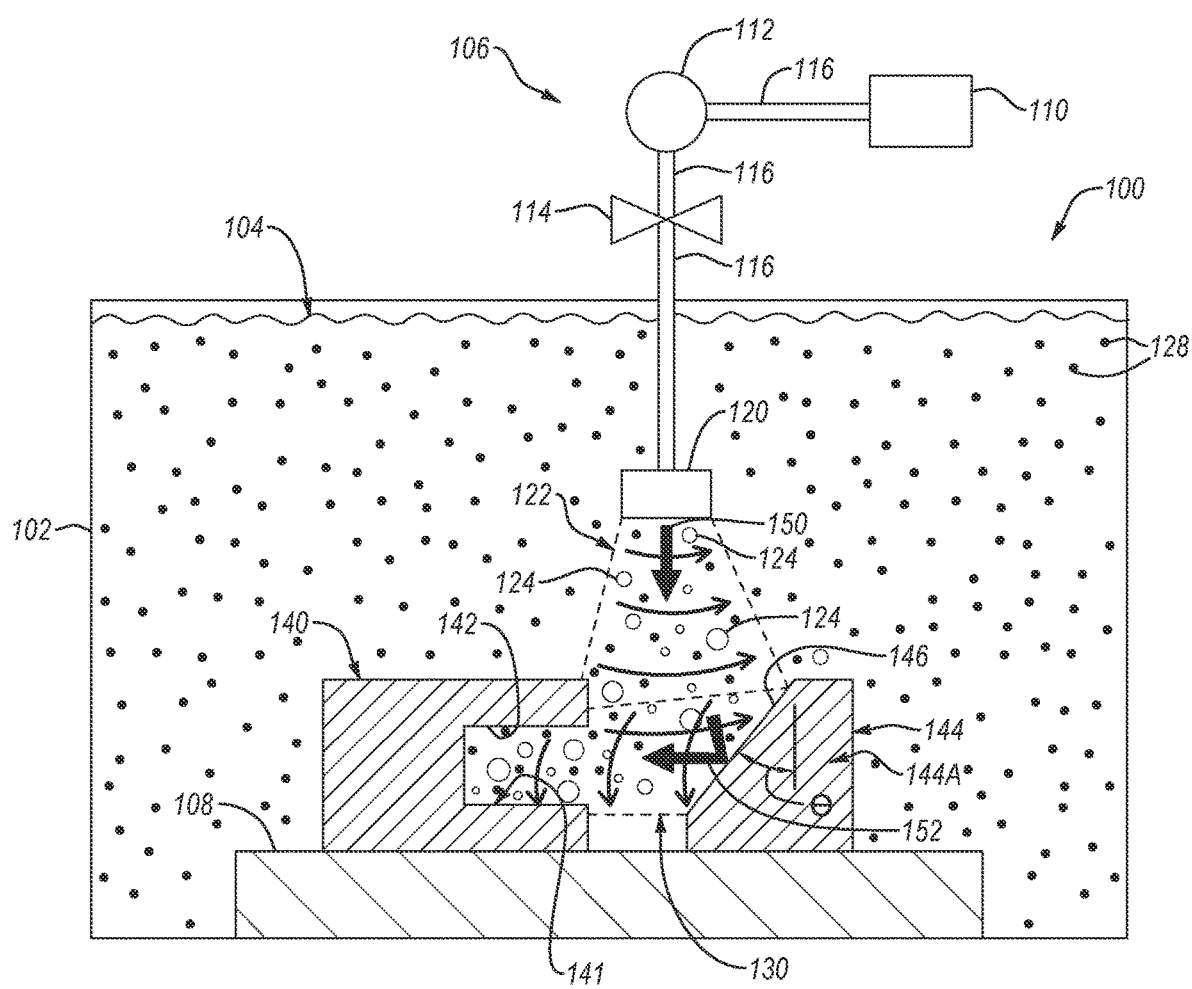
FIG. 2 is a schematic side view of a system for surface treating an internal surface of a part, according to one or more examples of the present disclosure.

The nozzle 120 is any of various devices configured to introduce high-pressure fluid into the fluid 104 in a manner that produces a high-speed stream (e.g., cloud, jet, etc.) of cavitated fluid 122. Cavitated fluid 122 is fluid that contains vapor cavities 124, or small liquid-free bubbles, formed by a rapid change in pressure of the fluid 104 or other force acting on the fluid 104. When the vapor cavities 124, which contain vapor or air at a low pressure, are subjected to a higher pressure, the vapor cavities 124 implode, which generates a shockwave of fluid. The high pressure necessary to induce implosion of the vapor cavities 124 can be caused by the build-up of fluid pressure on the vapor cavities 124 after the vapor cavities 124 have impacted the surface of a part. The shockwaves induced by the implosion of the vapor cavities 124 is directed into the surface of the part. Depending on the energy of the shockwaves, the force of the shockwave can impart a compressive residual stress into the part. Such a process is known as fluid cavitation peening, which is depicted in FIG. 1. Referring to FIG. 2, reducing the energy of the stream of cavitated fluid 122 and introducing abrasive media 128 into the cavitated fluid 122, by adding abrasive media 128 to the fluid 104 in the tank 102, utilizes the shockwaves to drive the abrasive media 128 into the surface of the part, which smooths (i.e., reduces the roughness of) the surface by removing material from the surface. Although not shown in the systems 100 of FIGS. 3-8, in some examples, these systems 100 also include abrasive media 128 in the fluid 104 in the tank 102 to help reduce the roughness of the surface of the part by introducing the abrasive media 128 into the cavitated fluid 122.

The nozzle 120, in some examples, is thus configured to create a rapid change in pressure of the fluid 104 passing through the nozzle 120 so as to form vapor cavities 124 in the fluid 104 and transform the fluid 104 into the stream of cavitated fluid 122.

Although not shown, the system 100 can include a multi-axis robot coupled to one or more components of the stream generation subsystem 106, such as the nozzle 120. The robot is configured to move and orientate the nozzle 120 within the tank 102. In this manner, the nozzle 120 can be manipulated to direct the stream of cavitated fluid 122 in any of various directions (see, e.g., FIG. 7) from any of various locations within the tank 102. Notwithstanding the ability to manipulate the location and directionality of the stream of cavitated fluid 122 by moving and orientating the nozzle 120 in this manner, for some complex parts, such as those with internal surfaces, due to obstructions created by the part, it is not possible to sufficiently manipulate the nozzle 120 to direct the stream of cavitated fluid 122 from the nozzle 120 directly to the internal surfaces of the part. For this reason, the system 100 includes a deflection tool 144, which allows the stream of cavitated fluid 122, which initially is not aimed directly at the internal surfaces of a part, to be redirected to be aimed directly at the internal surfaces of the part.

The deflection tool 144 of the system 100 is located within the tank 102 adjacent or coupled to the part 140 to be surface treated. More specifically, the deflection tool 144 is located and positioned to receive the stream of cavitated fluid 122, from the nozzle 120, at one or more deflection surfaces 146 of the deflection tool 144, and to redirect the stream of cavitated fluid 122 at one or more internal surfaces 142 of the part 140.

The part 140 has a complex shape. As used herein, a complex shape is any shape that has a recessed portion 141 or partially enclosed portion. The internal surface(s) 142 is the surface(s) defining the recessed portion 141 or partially enclosed portion of the part 140. More specifically, in some examples, the internal surface(s) 142 of the part 140 are those surfaces that are not in line-of-sight with the nozzle 120. Referring to FIG. 1, for example, the recessed portion 141 is a side-slot in the part 140 that is open on a side of the part. The internal surface 142 defines the side-slot and includes portions that are mostly obstructed from line-of-sight of the nozzle 120, even if the nozzle 120 were moved into a more angled position than that shown in FIG. 1. Because portions of the internal surface 142 of the recessed portion 141 are obstructed from the nozzle 120, the stream of cavitated fluid 122 generated by the nozzle 120 would not reach these obstructed portions of the internal surface 142 at all or with enough intensity to effectively surface treat the obstructed portions. More specifically, although the stream of cavitated fluid 122 includes some omni-directional flow of the vapor cavities 124, and thus some surfaces of the part 140 not in line-of-sight with the nozzle 120 may be impacted by some of the vapor cavities 124, the quantity or intensity of the vapor cavities 124 impacting these surfaces may be inefficient to effectively surface treat the surfaces.

The deflection surface 146 of the deflection tool 144 helps to redirect the stream of cavitated fluid 122 toward the internal surface 142, which increases the quantity or intensity of the vapor cavities 124 impacting the internal surface 142, thus improving the surface treatment of the internal surface 142. Generally, in certain examples, the deflection surface 146 has a contour that complements a contour of the internal surface 142 of the part 140. As used herein, in one example, the contour of the deflection surface 146 can be considered to complement the contour of the internal surface 142 of the part 140 when the deflection surface 146 is shaped in response to the shape of the internal surface 142 so that the stream of cavitated fluid 122 deflected off of the deflection surface 146 is directed towards the internal surface 142.

Because the stream of cavitated fluid 122 includes omni-directional flow of the vapor cavities 124, the stream expands or diverges as the stream moves away from the nozzle 120. However, because the stream of cavitated fluid 122, upon exit from the nozzle 120, is directed in the same initial direction and an averaged flow of the vapor cavities 124 are in the initial direction, the stream of cavitated fluid 122 can be defined as flowing in the first direction 150, indicated by a directional arrow. The first direction 150 is away from the internal surface 142 of the part 140 because the part 140 obstructs the vapor cavities 124 of the stream of cavitated fluid 122 from reaching the internal surface 142 or the first direction is offset from, diverges away from, or is aimed away from the internal surface 142. The first direction 150 is aimed at the deflection surface 146 of the deflection tool 144. Accordingly, at least part (e.g., all or a majority) of the stream of cavitated fluid 122 impacts the deflection surface 146.

The deflection surface 146 redirects the stream of cavitated fluid 122 in the second direction 152. Because the redirected stream of cavitated fluid 130 includes omni-directional flow of the vapor cavities 124, the redirected stream may widen or diverge as the stream moves away from the deflection surface 146. However, because the redirected stream of cavitated fluid 130, upon deflection from the deflection surface 146, is directed in the same initial direction and an averaged flow of the vapor cavities 124 are in the initial direction, the redirected stream of cavitated fluid 130 can be defined as flowing in the second direction 152, indicated by a directional arrow. The second direction 152 is toward the internal surface 142 of the part 140 because no portion of the part 140 obstructs the vapor cavities 124 of the redirected stream of cavitated fluid 130 from reaching the internal surface 142 or the second direction is aimed at the internal surface 142.

The deflection tool 144 is made of a material that is less malleable than that of the part 140. Accordingly, the stream of cavitated fluid 122 has less effect on the deflection tool 144 than on the part 140. Moreover, in some examples, the material of the deflection tool 144 is selected, in view of the intensity of the stream of cavitated fluid 122, to have a malleability low enough that the stream of cavitated fluid 122 has little to no effect on the deflection tool 144 as the stream impacts the deflection tool 144. According to one example, the deflection tool 144 is made of a tool steel, such as 4030 alloy steel and the like.

The deflection surface 146 is angled at an angle θ relative to the first direction 150. The angle θ is more than zero-degrees, but less than 90-degrees. The angle θ of the deflection surface 146 relative to the first direction 150 determines the angle of the second direction 152 relative to the first direction 150 or the angle of the second direction 152 relative to horizontal. Depending on the angle θ, the second direction 152 can be horizontal, downwardly directed, or upwardly directed. Accordingly, the deflection tool 144 is configured to have an angle θ that results in the second direction 152 being aimed at the internal surface 142 of the part 140.

The part 140 is located in the tank 102 and is fixed to the tank 102. In some examples, the part 140 is fixed to a fixture plate 108 or other surface that forms a bottom of the tank 102. The fixture plate 108 provides a stable surface on which the part 140 can be fixed while the part 140 is surface treated. Fixation components, such as clamps, fasteners, brackets, straps, and the like can be used to fix the part 140 on the fixture plate 108.

The deflection tool 144 is located within the tank 102 adjacent to or coupled to the part 140. Generally, the deflection tool 144 is located within the tank 102, relative to the part 140, such that the deflection surface 146 receives the stream of cavitated fluid 122 and redirects the stream of cavitated fluid 122 toward the internal surface 142 of the part 140. Referring to FIGS. 1 and 2, because the recessed portion 141 is a side-slot, the deflection tool 144 is a first deflection tool 144A located adjacent the part 140. The deflection surface 1446 of the first deflection tool 144A faces the recessed portion 141. As used herein, adjacent means either spaced apart from, such as shown in FIG. 1, or touching (e.g., abutting) an exterior surface of the part 140.

Because the stream of cavitated fluid 122 is obstructed from entering most of the recessed portion 141 of the part 140 of FIGS. 1 and 2, the deflection tool 144A is located outside of and adjacent to the part 140. Moreover, because the recessed portion 141 is on one side of the part 140, the deflection tool 144A includes only one deflection surface 146. Additionally, to maintain the breadth of coverage of the stream of cavitated fluid 122, the deflection surface 146 of the deflection tool 144A is flat, which results in a redirected stream of cavitated fluid 130 that has a coverage at least at broad as the stream of cavitated fluid 122 impacting the deflection surface 146. Generally, as the redirected stream of cavitated fluid 130 travels away from the deflection surface 146, due to the omni-directional movement of the vapor cavities 124, the redirected stream of cavitated fluid 130 expands or diverges.

Figure 3:
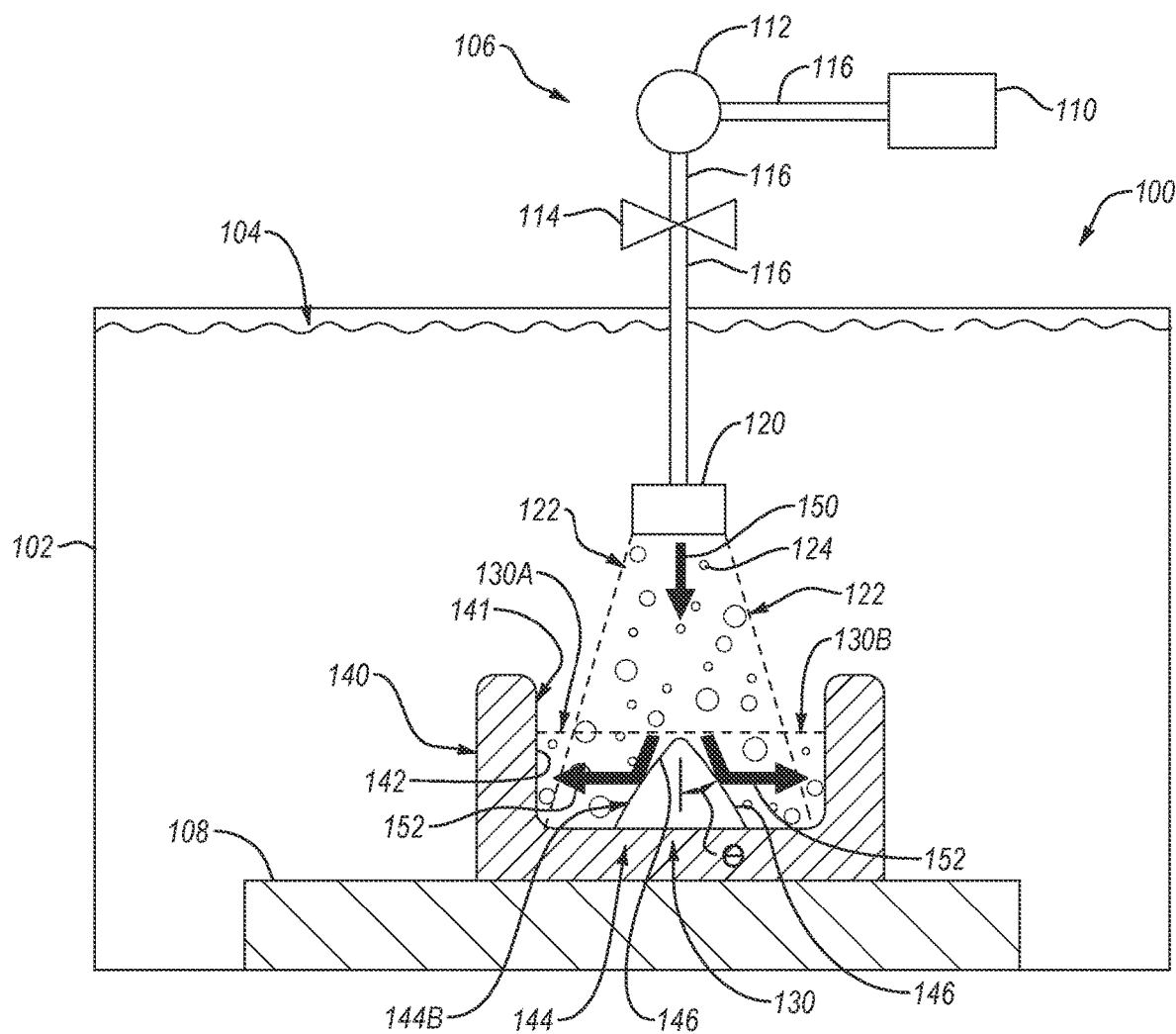
FIG. 3 is a schematic side view of a system for surface treating an internal surface of a part, according to one or more examples of the present disclosure.

Referring to FIG. 3, the recessed portion 141 of the part 140 is a cavity, depression, slot, channel, or other recess formed in a top or upwardly facing surface of the part 140. Because the recessed portion 141 of the part 140 of FIG. 3 is at least partially upwardly open, at least some portion of the stream of cavitated fluid 122 is capable of directly entering the recessed portion 141. However, some portions of the internal surface 142 defining the recessed portion 141, such as the internal surface defining the upright sidewalls of the part 140, may be angled such that a direct impact with the stream of cavitated fluid 122 is not possible. Accordingly, in some examples, the internal surface(s) 142 of the part 140 are those surfaces that cannot receive a direct impact (e.g., where the first direction is aimed at the internal surface(s) 142) from the stream of cavitated fluid 122 generated by the nozzle 120. In such examples, directly impacting portions of the internal surface 142 with cavitated fluid that are not able to receive a direct impact from the stream of cavitated fluid 122 is accomplished by locating the deflection tool 144 within the recessed portion 141. The deflection tool 144 is located on the part 140, within the recessed portion 141. In certain examples, the deflection tool 144 is coupled to the part 140, such as via fasteners, clips, brackets, adhesives, and the like.

Additionally, to help redirect the stream of cavitated fluid 122 to multiple opposing portions of the internal surface 142, the deflection tool 144 is a second deflection tool 144B that has at least two deflection surfaces 146. Each of the deflection surfaces 146 defines an angle θ relative to the first direction 150 of the stream of cavitated fluid 122. By aiming the stream of cavitated fluid 122 at the recessed portion 141, and more specifically at the intersection of the at least two deflection surfaces 146 of the deflection tool 144B, a first portion of the stream of cavitated fluid 122 is redirected off of one of the deflection surfaces 146 of the deflection tool 144B toward a first portion of the internal surface 142 and second portion of the stream of cavitated fluid 122 is redirected off of another of the deflection surfaces 146 of the deflection tool 144B toward a second portion of the internal surface 142 (which, in the illustrated example of FIG. 3, is opposite the first portion of the internal surface 142). In this manner, a first redirected stream of cavitated fluid 130A directly impacts a desired portion of the internal surface 142 and a second redirected stream of cavitated fluid 130B directly impacts a different desired portion of the internal surface 142.

Figure 4:
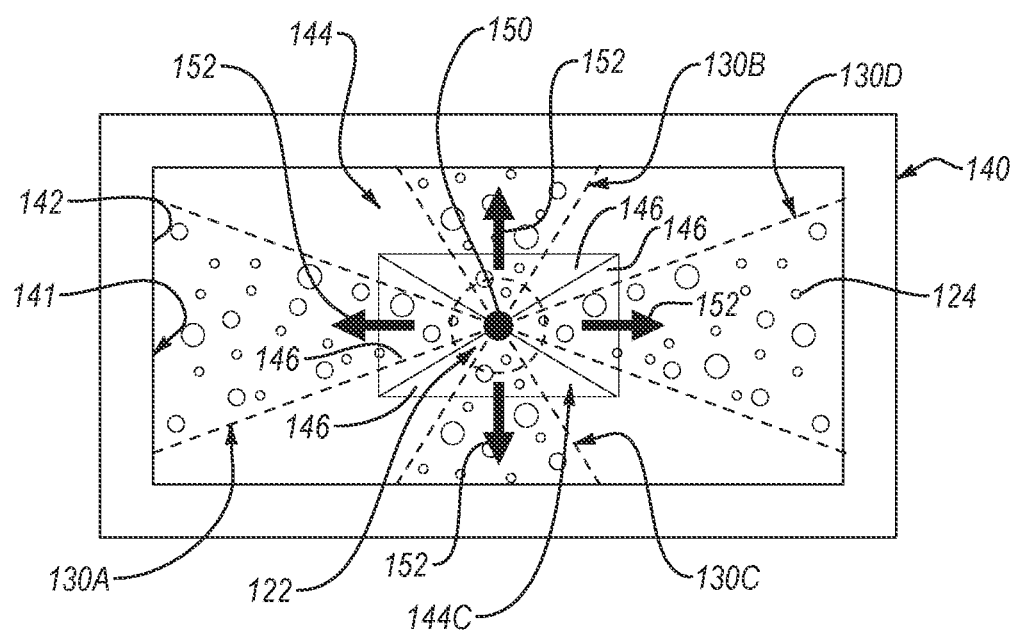
FIG. 4 is a schematic top view of a system for surface treating an internal surface of a part, according to one or more examples of the present disclosure.
Figure 5:
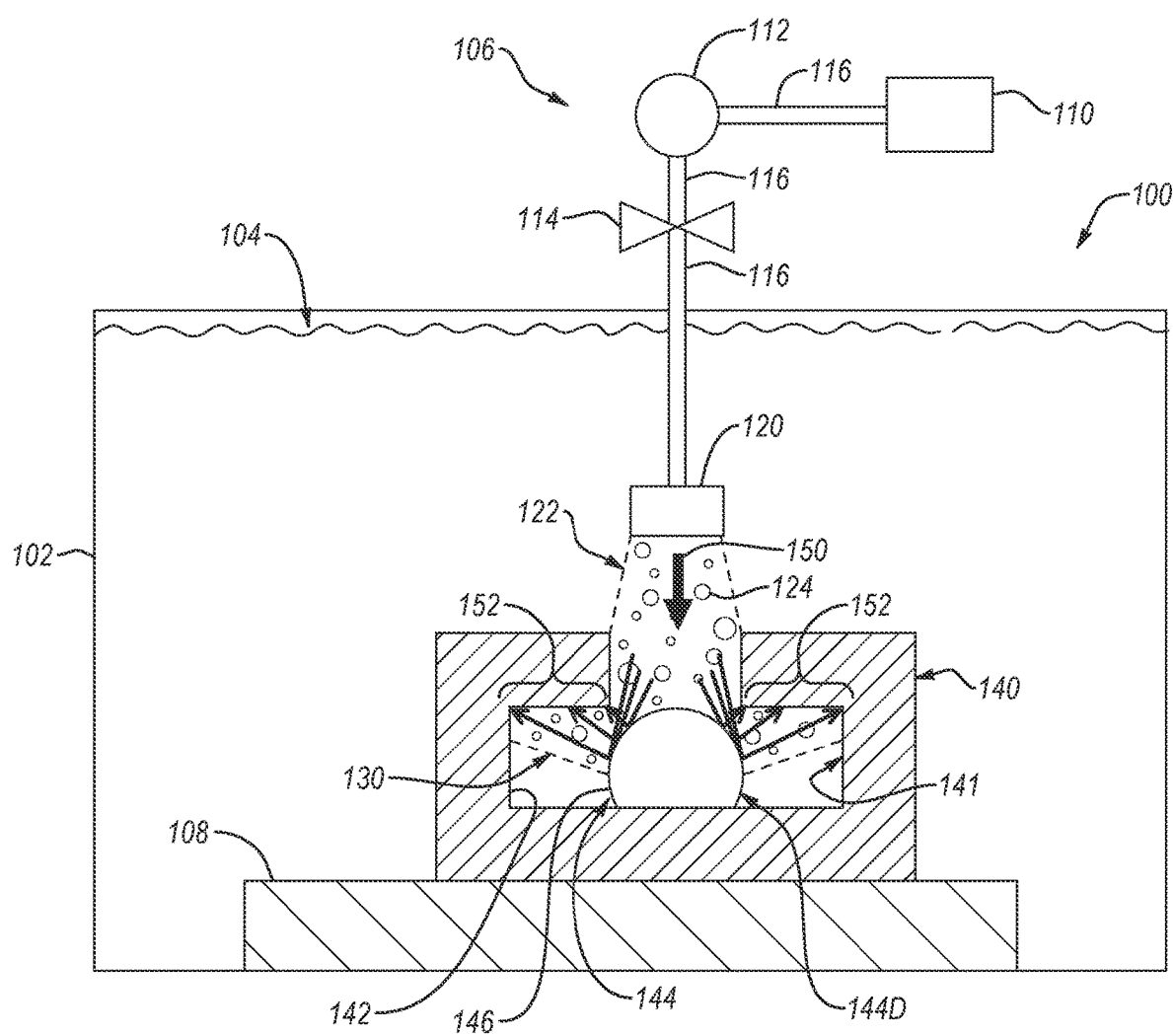
FIG. 5 is a schematic side view of a system for surface treating an internal surface of a part, according to one or more examples of the present disclosure.
Figure 6:
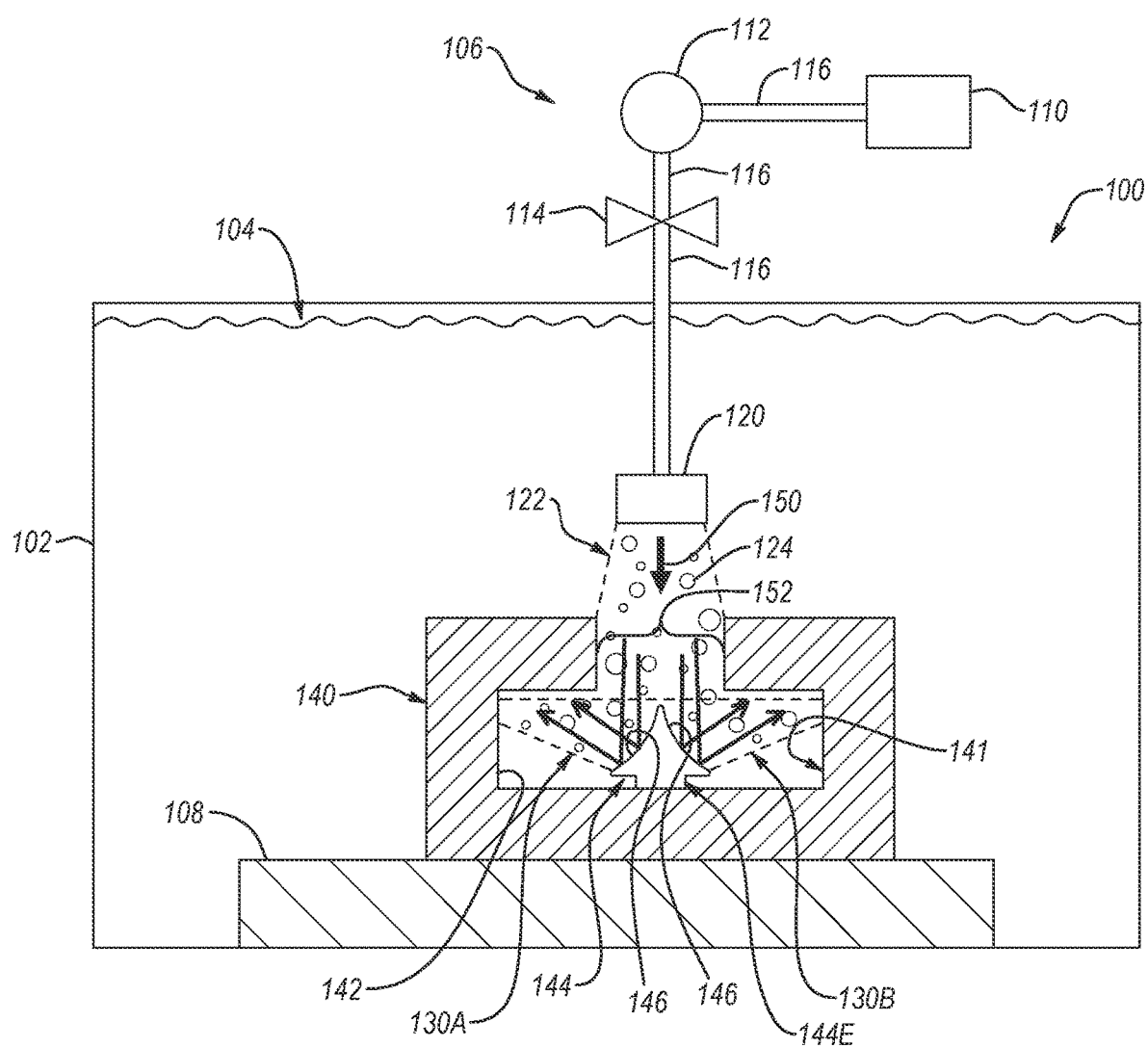
FIG. 6 is a schematic side view of a system for surface treating an internal surface of a part, according to one or more examples of the present disclosure.

Referring to FIG. 4, to help redirect the stream of cavitated fluid 122 to even more opposing portions of the internal surface 142 of the recessed portion 141, the deflection tool 144 is a third deflection tool 144C that has at least four deflection surfaces 146. In some implementations, the third deflection tool 114C has is pyramid shaped. The recessed portion 141 of FIG. 4 is a pocket (e.g., a rectangular-shaped pocket) with four sides, each perpendicular to an adjacent side, and the part 140 can be a bathtub fitting. In certain examples, FIG. 3 can be considered a cross-section of FIG. 4. Each of the deflection surfaces 146 defines an angle θ relative to the first direction 150 of the stream of cavitated fluid 122. By aiming the stream of cavitated fluid 122 at the recessed portion 141, and more specifically at the intersection of the at four deflection surfaces 146 of the third deflection tool 144C, four different portions of the stream of cavitated fluid 122 are redirected off of four different deflection surfaces 146 of the deflection tool 144B toward four different portions of the internal surface 142. In this manner, a first redirected stream of cavitated fluid 130A directly impacts a first portion of the internal surface 142, a second redirected stream of cavitated fluid 130B directly impacts a second portion of the internal surface 142, a third redirected stream of cavitated fluid 130B directly impacts a third portion of the internal surface 142, and a fourth redirected stream of cavitated fluid 130B directly impacts a fourth portion of the internal surface 142. In some examples, as shown, the second direction 152 of a redirected stream is perpendicular relative to the portion of the internal surface being impacted, which improves the effectiveness of the surface treatment in certain implementations. However, in other examples, the second direction 152 of the redirected stream is not perpendicular relative to the portion of the internal surface being impacted.

In contrast to the deflection surfaces 146 of the first deflection tool 144A, the second deflection tool 144B, and the third deflection tool 144C, which are flat, in some examples, the deflection surface(s) 146 of the deflection tool 144 is curved. Curving the deflection surfaces 146 helps to broaden or narrow the coverage of the redirected stream of cavitated fluid 130. As one example, referring to FIG. 5, the deflection tool 144 is a fourth deflection tool 144D with a deflection surface 146 that is convex. When impacted by the stream of cavitated fluid 122, the convexity of the deflection surface 146 redirects the stream of cavitated fluid 122 into a redirected stream of cavitated fluid 130 with a broader coverage than the stream of cavitated fluid 122 impacting the deflection surface 146. In other words, the convexity of the deflection surface 146 magnifies the divergence of the redirected stream of cavitated fluid 130, which can help to increase the portion of the internal surface 142 directly impacted by the cavitated fluid 122. In some examples, the fourth deflection tool 144D comprises a sphere and the deflection surface 146 is the surface of the sphere. A sphere helps cavitated fluid 122 reach more of the internal surface 142, particularly where the part 140 has a narrow opening into a larger internal cavity, such as the case with the part 140 of FIG. 5. Although the fourth deflection tool 144D is a sphere with circular cross-sectional shapes, in other examples, the deflection tool 144 can be sphere-like, with a convex deflection surface and oblong or non-circular cross-sectional shapes, to produce a redirected stream of cavitated fluid 130 with an intensity that predictably varies across the redirected stream.

In contrast to the deflection surface 146 of the fourth deflection tool 144D, which is convex, in some examples, the deflection surface(s) of the deflection tool 144 is concave. As one example, referring to FIG. 6, the deflection tool 144 is a fifth deflection tool 144E with a deflection surface 146 that is concave. When impacted by the stream of cavitated fluid 122, the concavity of the deflection surface 146 redirects the stream of cavitated fluid 122 into a redirected stream of cavitated fluid 130A with a narrower coverage than the stream of cavitated fluid 122 impacting the deflection surface 146. In other words, the concavity of the deflection surface 146 converges or concentrates the redirected stream of cavitated fluid 130, which can help to increase the intensity of the cavitated fluid 122 at a focused portion of the internal surface 142. In some examples, as shown, the fifth deflection tool 144E includes at least two deflection surfaces 146 each with a concave shape, which facilitates concentrated impacts of cavitated fluid 130 at two portions of the internal surface 142.

Figure 7:
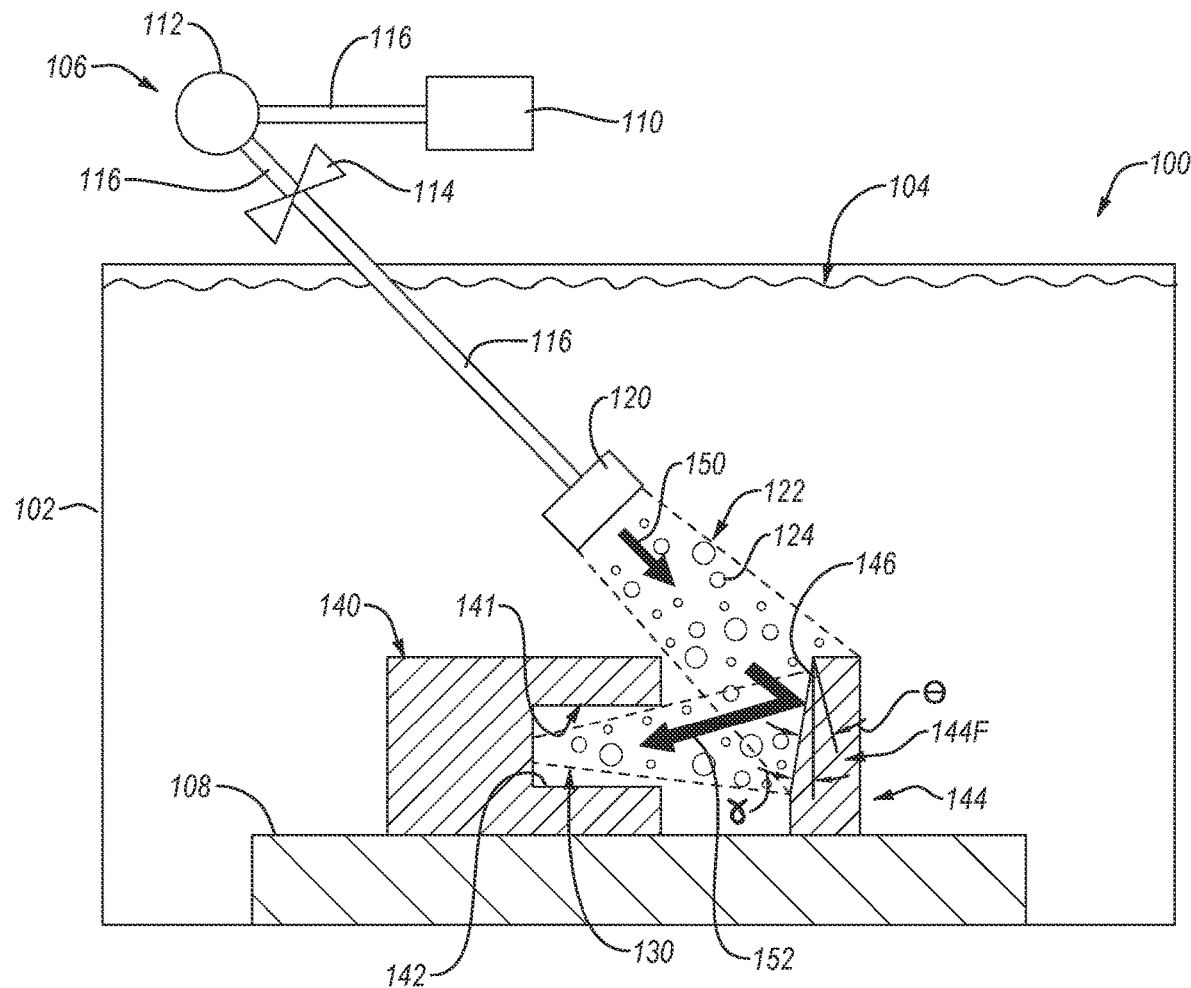
FIG. 7 is a schematic side view of a system for surface treating an internal surface of a part, according to one or more examples of the present disclosure.

Referring now to FIG. 7, according to some examples, the orientation of the nozzle 120 is adjustable to adjust the first direction 150 of the stream of cavitated fluid 122. Accordingly, as shown, the first direction 150 of the stream of cavitated fluid 122 is angled (at some angle between zero-degrees and 90-degrees) relative to vertical, while the first direction 150 of the stream of cavitated fluid 122 of FIG. 1 is not angled relative to vertical (e.g., parallel to vertical). The system 100 of FIG. 7 is similar to that of FIG. 1 except to compensate for the angle of the first direction 150, the angle γ of the deflection surface 146 of the sixth deflection tool 144F, relative to vertical, is different than that in FIG. 1. In some examples, the angle γ of the deflection surface 146 of the sixth deflection tool 144F is such that the angle θ of the deflection surface 146 relative to the angled first direction 150 in FIG. 7 is the same as the angle θ of the deflection surface 146 relative to the non-angled first direction 150 in FIG. 1. Moreover, in certain examples, the first direction 150 is angled and the sixth deflection tool 144F is configured such that the second direction 152 in FIG. 7 is the same direction as the second direction 152 in FIG. 1.

Accordingly, a system 100 where the first direction 150 is angled can still produce the same second direction 152 as a system 100 where the first direction 150 is not angled.

Figure 8:
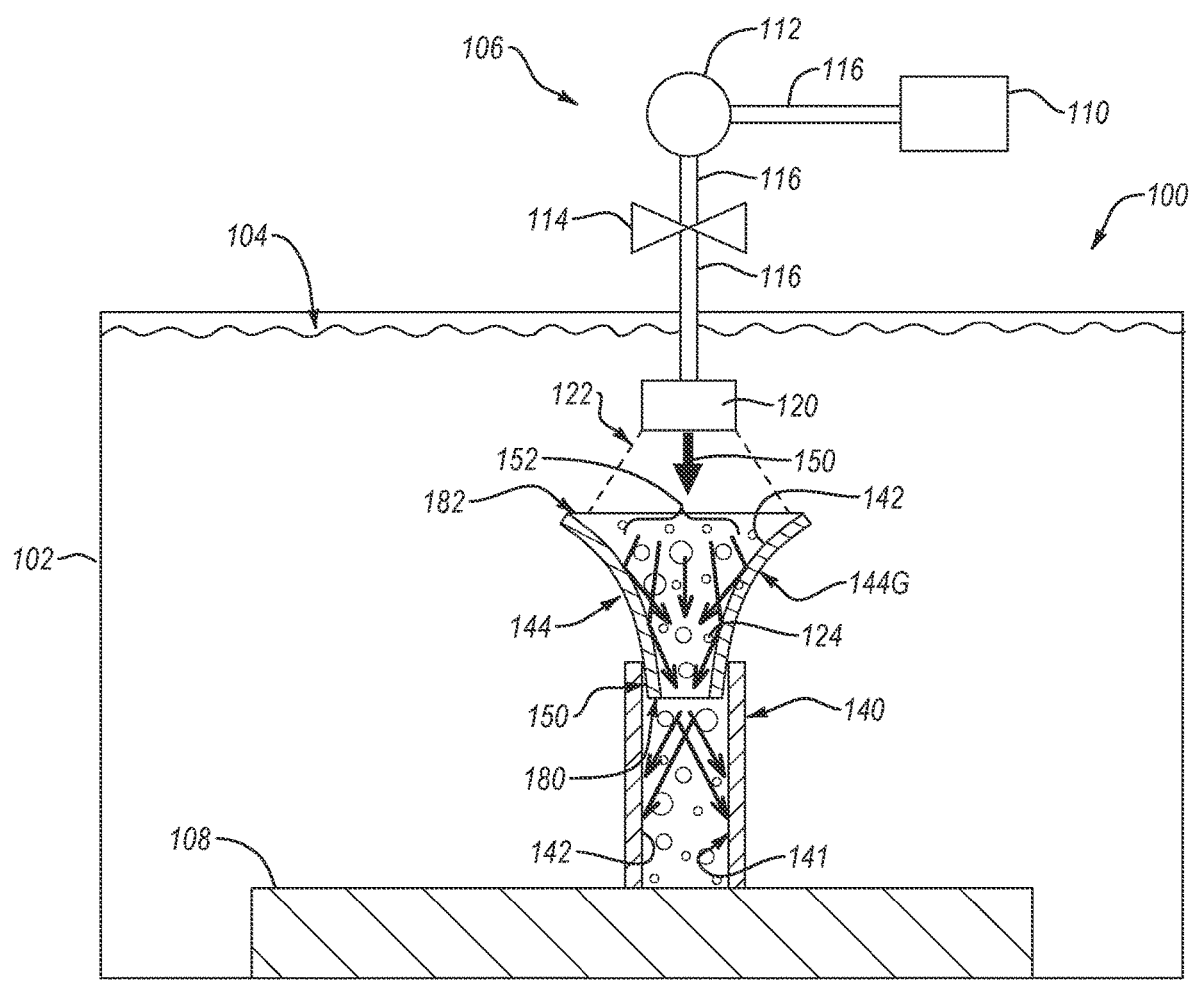
FIG. 8 is a schematic side view of a system for surface treating an internal surface of a part, according to one or more examples of the present disclosure.

Referring to FIG. 8, the system 100 is configured to treat the internal surface of a part 140 that has a tube-like shape. The recessed portion 141 of the part 140 in FIG. 8 is an elongate, circumferentially closed, conduit. Accessing the conduit and directing the stream of cavitated fluid 122 into the conduit, with an intensity sufficient to treat the internal surface 142 of the conduit, can be difficult. Accordingly, the deflection tool 144 of the system 100 is a seventh deflection tool 144G with a deflection surface 146 that is curved and convex, similar to the fourth deflection tool 144D. However, unlike the fourth deflection tool 144D, the deflection surface 146 is inwardly directed such that the seventh deflection tool 144G has a funnel-like shape. A narrow outlet portion 180 of the seventh deflection tool 144G is sized to be partially inserted into the conduit of the part 140 such that a wide inlet portion 182 of the seventh deflection tool 144G is external to the conduit. The nozzle 120 is located and oriented such that the first direction 150 is aimed into the wide inlet portion 182. In this configuration, at least a portion of the stream of cavitated fluid 122 generated by the nozzle 120 is directed into the seventh deflection tool 144G. After entering the seventh deflection tool 144G, the stream of cavitated fluid 122 is redirected by the deflection surface 146. The inwardly-facing convexity of the deflection surface 146 acts to concentrate or converge the stream of cavitated fluid 122 into a more narrow redirected stream of cavitated fluid 122, which is introduced from the seventh deflection tool 144G into the conduit of the part 140 where it treats the internal surface 142 defining the conduit.

Figure 9:
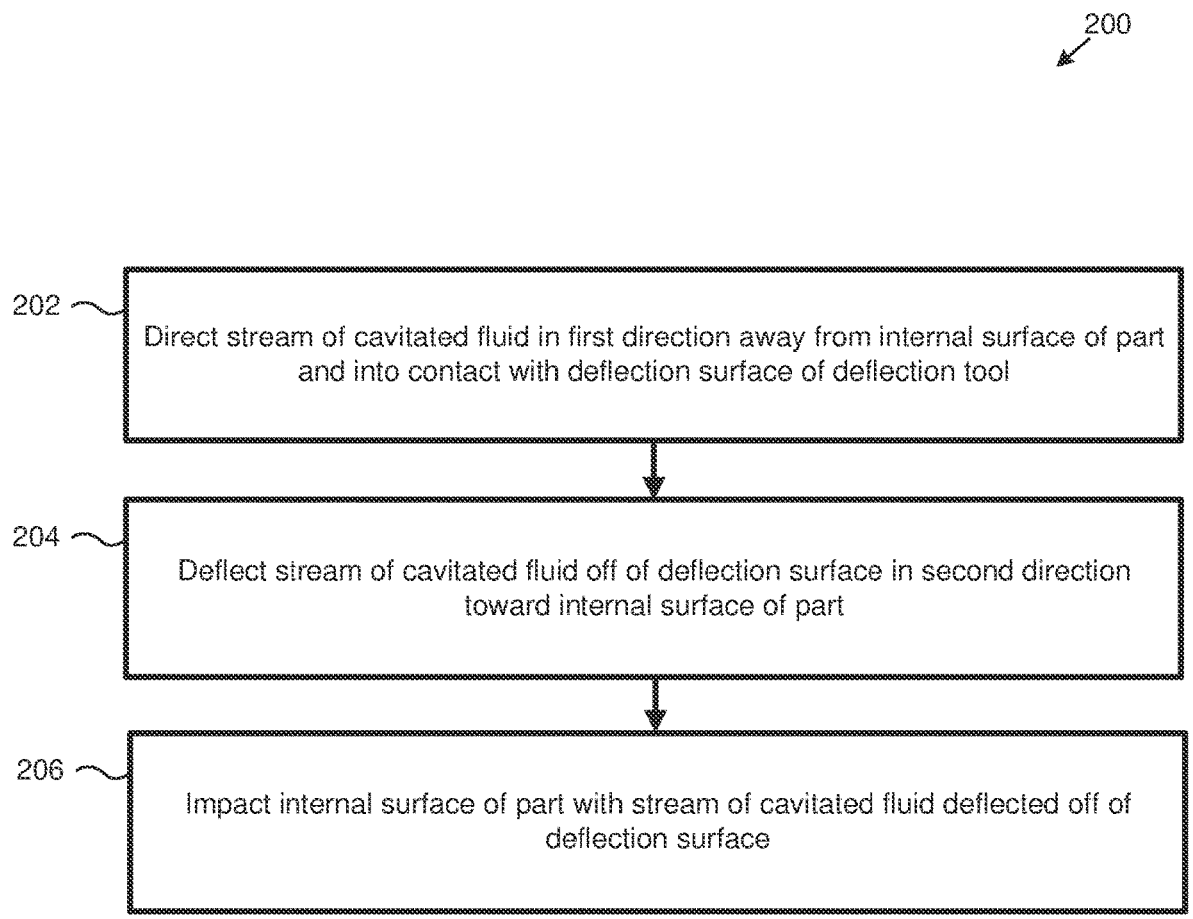
FIG. 9 schematic flow chart of a method of surface treating an internal surface of a part, according to one or more examples of the present disclosure.

Referring to FIG. 9, according to some examples, a method 200 of surface treating an internal surface 142 of a part 140 is disclosed herein. The method 200 includes (block 202) directing the stream of cavitated fluid 122 in the first direction 150 away from the internal surface 142 of the part 140 and into contact with the deflection surface 146 of the deflection tool 144. The method 200 also includes (block 204) deflecting the stream of cavitated fluid 122 off of the deflection surface 146 in the second direction 152 toward the internal surface 142 of the part 140. The method 200 additionally includes (block 206) impacting the internal surface 142 of the part 140 with the stream of cavitated fluid 122 deflected off of the deflection surface 146. In certain examples, the internal surface 142 is not within a line-of-sight of the nozzle 120 that generates the stream of cavitated fluid 122.

The method 200 additionally includes, in some examples, selecting the deflection tool 144 and corresponding deflection surface 146 in response to at least one of the geometry of the part 140, including the shape and location, on the part 140, of the internal surface 142, or the material of the part 140. For example, for internal surfaces 142 that are harder to access, a deflection tool 144 with a deflection surface 146 that imparts a more drastic redirection of the stream of cavitated fluid 122 is desired. As another example, for parts 140 made of more malleable materials, a deflection tool 144 with imparts a less drastic redirection of the stream of cavitated fluid 122 is desired.

In some examples, the method 200 additionally includes determining an intensity of the stream of cavitated fluid 122 to achieve a desired surface treatment of the part 140. Determining the intensity of the stream of cavitated fluid 122 can be based on one or more factors, such as the malleability of the part 140, the surface roughness of the part 140, the geometry of the part 140, the desired surface roughness of the part 140, and/or the desired residual stress level in the part 140. The method 200 can further include positioning and orienting the part 140 and the selected deflection tool 144, in the tank 102, relative to each other. The method 200 also includes generating the stream of cavitated fluid 122 with the determined intensity and impacting the part with the stream of cavitated fluid 122 using the selected deflection tool 144, at the desired position and orientation relative to the part 140, for a corresponding period of time to achieve the desired surface treatment of the part 140.

In certain examples of the method 200, (block 206) impacting the internal surface 142 of the part 140 with the stream of cavitated fluid 122 deflected off of the deflection surface 146 includes imparting a compressive stress to the part 140 at the internal surface 142, such as is shown in FIG. 1. Additionally, or alternatively, in some examples, the method 200 further includes introducing abrasive media 128 into the stream of cavitated fluid 122 and (block 206) impacting the internal surface 142 of the part 140 with the stream of cavitated fluid 122 deflected off of the deflection surface 146 includes impacting the internal surface 142 of the part 140 with the abrasive media introduced into the stream of cavitated fluid 122 and reducing a surface roughness of the internal surface 142 of the part 140 with the abrasive media 128, such as is shown in FIG. 2. According to other examples of the method 200, at least a portion of the deflection tool 144 is located within a recessed portion 141 of the part 140 and the stream of cavitated fluid 122 is directed at least partially into the recessed portion 141 of the part 140 in the first direction 150.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of surface treating an internal surface of a part, the method comprising:
   directing a stream of cavitated fluid, by a nozzle, in a first direction away from the internal surface of the part and into contact with a deflection surface of a deflection tool, wherein the deflection tool is fixed, relative to the internal surface of the part, and the nozzle is movable, relative to the deflection tool;
   deflecting the stream of cavitated fluid off of the deflection surface in a second direction toward the internal surface of the part; and
   impacting the internal surface of the part with the stream of cavitated fluid deflected off of the deflection surface.

2. The method according to claim 1, wherein impacting the internal surface of the part with the stream of cavitated fluid comprises imparting a compressive stress to the part at the internal surface.

3. The method according to claim 1, further comprising introducing abrasive media into the stream of cavitated fluid, wherein impacting the internal surface of the part with the stream of cavitated fluid comprises impacting the internal surface of the part with the abrasive media introduced into the stream of cavitated fluid and reducing a surface roughness of the internal surface of the part with the abrasive media.

4. The method according to claim 3, wherein impacting the internal surface of the part with the stream of cavitated fluid comprises imparting a compressive stress to the part at the internal surface.

5. The method according to claim 1, wherein:
   at least a portion of the deflection tool is located within a recessed portion of the part; and
   at least a portion of the recessed portion of the part defines the internal surface.

6. The method according to claim 5, wherein the stream of cavitated fluid is directed at least partially into the recessed portion of the part in the first direction.

7. The method according to claim 1, wherein:
   the nozzle does not have line-of-sight with the internal surface of the part; and
   the deflection surface has line-of-sight with the internal surface of the part.

8. The method according to claim 1, further comprising:
   manipulating an orientation of the nozzle, relative to the deflection tool, to adjust the stream of cavitated fluid in a third direction away from the internal surface of the part and into contact with the deflection surface of the deflection tool, wherein:
   the third direction is different from the first direction; and
   the stream of cavitated fluid is deflected off of the deflection surface in the second direction toward the internal surface of the part.

9. The method according to claim 1, further comprising adjusting an intensity of the stream of cavitated fluid to increase or decrease the impact of the stream of cavitated fluid on the internal surface of the part.

10. The method according to claim 9, wherein the intensity of the stream of cavitated fluid is based on one or more of:
   a malleability of the part;
   a surface roughness of the part;
   a geometry of the part;
   a desired surface roughness of the part; and
   a desired residual stress level in the part.

11. The method according to claim 1, further comprising selecting the deflection tool and the corresponding deflection surface in response to one or more of:
- a geometry of the part;
- a shape of the internal surface;
- a location of the internal surface on the part; and
- a material of the part.

12. The method according to claim 1, wherein malleability of the deflection surface of the deflection tool is greater than malleability of the part.

13. The method according to claim 1, wherein the deflection tool has at least two deflection surfaces, and the stream of cavitated fluid is deflected off of the at least two deflection surfaces in the second direction and a third direction, different than the second direction.

14. The method according to claim 13, wherein impacting the internal surface of the part with the stream of cavitated fluid further includes impacting the internal surface of the part with the stream of cavitated fluid for a corresponding period of time to achieve a desired surface treatment of the internal surface of the part.

15. The method according to claim 1, wherein:
- the stream of cavitated fluid is directed in the first direction away from the internal surface of the part and into contact with at least two deflection surfaces of the deflection tool;
- a first portion of the stream of cavitated fluid is deflected off of a first one of the at least two deflection surfaces of the deflection tool in a second direction toward a first portion of the internal surface of the part;
- a second portion of the stream of cavitated fluid is deflected off of a second one of the at least two deflection surfaces of the deflection tool in a third direction toward a second portion of the internal surface of the part;
- the first portion of the internal surface of the part is impacted with the first portion of the stream of cavitated fluid deflected off of the first one of the at least two deflection surfaces; and
- the second portion of the internal surface of the part is impacted with the second portion of the stream of cavitated fluid deflected off of the second one of the at least two deflection surfaces.

16. A method of surface treating an internal surface of a part, the method comprising:
- directing a stream of cavitated fluid in a first direction away from the internal surface of the part and into contact with a deflection surface of a deflection tool, wherein the deflection tool is non-movably fixed, relative to the internal surface of the part, such that the deflection tool is not movable relative to the internal surface of the part, wherein the stream of cavitated fluid is directed by a nozzle;
- deflecting the stream of cavitated fluid off of the deflection surface in a second direction toward the internal surface of the part;
- impacting the internal surface of the part with the stream of cavitated fluid deflected off of the deflection surface; and
- moving the nozzle relative to the deflection tool.

17. The method according to claim 16, wherein impacting the internal surface of the part with the stream of cavitated fluid comprises imparting a compressive stress to the part at the internal surface.

18. The method according to claim 16, further comprising introducing abrasive media into the stream of cavitated fluid, wherein impacting the internal surface of the part with the stream of cavitated fluid comprises impacting the internal surface of the part with the abrasive media introduced into the stream of cavitated fluid and reducing a surface roughness of the internal surface of the part with the abrasive media.

19. The method according to claim 18, wherein impacting the internal surface of the part with the stream of cavitated fluid comprises imparting a compressive stress to the part at the internal surface.

20. The method according to claim 16, wherein:
- the nozzle does not have line-of-sight with the internal surface of the part; and
- the deflection surface has line-of-sight with the internal surface of the part.

* * * * *